3,081,147
CONTROL OF CARBONATE CONCENTRATION IN CARBONATE LEACHING OF URANIUM-BEARING ORES BY CALCIUM SULFATE ADDITION
Robert A. Koble, Bartlesville, Okla., assignor to Phillips Petroleum Company, a corporation of Delaware
No Drawing. Filed Dec. 18, 1959, Ser. No. 860,372
2 Claims. (Cl. 23—14.5)

This invention relates to the recovery of uranium from uranium-bearing materials. In another aspect, it relates to the recovery of uranium values from uranium-bearing ores by the carbonate leaching process.

An important and widely used hydrometallurgical process for recovering uranium from uranium-bearing materials is the "carbonate leaching process." This leaching process has been applied to both primary and secondary uranium mineral deposits, such as pitchblende, coffinite, carnotite, uraninite, tyuyamunite, etc., but it is especially useful in leaching ore of high carbonate content. It is this leaching process that is the concern of the subject invention.

The carbonate leaching process for extracting uranium values from the uranium-bearing materials comprises contacting crushed uranium-bearing ore with hot recycle aqueous alkaline sodium carbonate-sodium bicarbonate solution and, where uranium is present in the quadrivalent state, an oxidizing agent, such as potassium permanganate or air, to form a slurry of leached pulp and pregnant leach liquor containing the stable soluble uranyl tricarbonate complex anion. The pregnant leach solution is separated from the leached pulp, for example by means of a plurality of vacuum drum filters operated in series, and after the pregnant leach solution is clarified, for example by filtering it through a precoated drum filter, the soluble uranium values are precipitated from the pregnant liquor by the addition of caustic, sodium hydroxide. This addition of sodium hydroxide causes the soluble uranium values to precipitate and form a precipitate comprising sodium diuranate (this precipitate commonly called "yellow cake"). The solution containing the precipitated yellow cake is then thickened and separated, for example by filtering the thickened solution in a drum filter. The yellow cake is then dried and packaged. The hydroxide-carbonate solution recovered as overflow during the thickening of the caustic-treated pregnant solution is commonly referred to as "barren liquor" and it is recarbonated by passing carbon dioxide through it, using, for example a supply of waste carbon dioxide such as flue gas. Recarbonated barren liquor is then commonly employed as a carbonate-bicarbonate wash liquid in the filtration of the slurry of leached pulp and pregnant leach solution. The recarbonated barren liquor is then recycled to the leaching operation for reuse.

Sodium hydroxide is continuously added to the clarified pregnant leach solution to neutralize the bicarbonate present in the latter solution, and an excess of sodium hydroxide is added to precipitate the uranium values present in the pregnant leach solution. In using the recarbonated barren liquor as a wash liquid, some of the carbonate-bicarbonate in the barren liquor is lost with the tailings, and the balance of the carbonate-bicarbonate in the barren liquor is recycled to the leaching operation. It is seen that the carbonate concentration in the process increases or builds-up, requiring a progressively increasing amount of excess sodium hydroxide to raise the pH of the pregnant leach solution to a point where the solubility of the uranium values is decreased and these values precipitated. Eventually, the amount of carbonate-bicarbonate lost with the tailings, together with the amount consumed in the operation, will be at equilibrium with the increasingly excess amount of sodium hydroxide added to the process. However, at this equilibrium, the carbonate concentration of the leach solution is greater than that desired in precipitation. If an attempt is made to add sodium hydroxide in an amount less than that actualy required for precipitation of all the uranium values, in order to keep the carbonate content in the process down and conserve the sodium hydroxide precipitant, it obviously follows that a lesser amount of soluble uranium values are precipitated and recovered. Although it is possible to bleed the recarbonated barren solution in an attempt to keep down the carbonate concentration, this also is not economical since it does result in the loss of a valuable reagent and also some valuable uranium values which are not precipitated. Also, the pyramiding of the carbonate concentration gives rise to a leaching solution having a carbonate concentration much higher than that required for effective leaching.

Accordingly, an object of this invention is to improve the recovery of uranium from uranium-bearing materials. Another object is to provide a method for increasing the recovery of uranium-bearing ores, such as coffinite, by the carbonate leaching process. Another object is to improve the extraction of uranium in a carbonate leaching process. Another object is to control the carbonate concentration in a carbonate leaching process and keep it in balance. Another object is to improve the precipitation of soluble uranium values from pregnant leach solution. Another object is to obviate the bleeding of recarbonated barren liquor in a carbonate leaching process in order to control the carbonate concentration thereof. Another object is to prevent the carbonate concentration in a carbonate leaching process from pyramiding. Other objects and advantages of this invention become apparent to those skilled in the art from the following discussion and appended claims.

Briefly stated, the subject invention comprises adding calcium sulfate to the carbonate leach solution in a carbonate leaching process for the recovery of uranium. The calcium sulfate is preferably added as the anhydride, but it can be added as the dihydrate, and the term "calcium sulfate" as used herein is meant to generically cover both. The addition of calcium sulfate according to the practice of this invention results in the control of a carbonate concentration in the process, the amount of calcium sulfate added to the carbonate leach solution being sufficient to prevent the carbonate concentration from pyramiding and exceeding that desired predetermined range at which the uranium ore is best leached and the soluble uranium values are best precipitated.

The calcium sulfate used in the practice of this invention can be added as an aqueous slurry of calcium sulfate, or as a slurry of calcium sulfate in a small side stream of the recycled carbonate leaching solution. The calcium sulfate is added to the process at a point upstream of the pulp filters, preferably to the leaching tank effluent or slurry. Alternatively, the calcium sulfate can be added to the ball mills used in grinding the ore with recycle carbonate leaching solution, or to the thickeners used in thickening the slurry of finely divided uranium ore and carbonate leaching solution.

The amount of calcium sulfate employed generally will be sufficient to maintain the pH of the carbonate leaching solution at about pH 10 and the carbonate concentration of the leaching solution at that concentration necessary to insure solubility of the uranium values, which will generally be about 20 to 50, preferably about 30, grams per liter, measured as $Na_2CO_3$.

The calcium sulfate reacts with some of the excess sodium carbonate in the leach solution to produce sodium sulfate and calcium carbonate, the latter precipitating out. When the slurry of leached pulp and pregnant leach liquor is filtered, the precipitated calcium carbonate is removed from the system along with the leached pulp or tailings, which are passed to a disposal pond. As a consequence, the sodium carbonate concentration in the process is prevented from building up or pyramiding, the amount of calcium carbonate precipitated and removed from the process with the leached pulp being about equivalent to the amount of excess sodium hydroxide added above that required to raise the pH of the pregnant leach solution to about a pH of about 12 and cause the precipitation of the soluble uranium values as sodium diuranate.

The sodium sulfate which is also formed, as a consequence of the reaction between the added calcium sulfate and the sodium carbonate present in the leaching solution, is soluble in the carbonate solution and will gradually build up to an equilibrium concentration at which the loss of sodium sulfate with the leached pulp, for example as a result of occlusion, equals the rate of sodium sulfate formation. A build-up of sodium sulfate in the system actually can be beneficial in that it results in a more rapid and complete precipitation of the yellow cake, hence the greater the recovery of soluble uranium values.

The following example further illustrates the objects and advantages of subject invention, the data there being based on a commercial carbonate leaching plant for the recovery of uranium values.

In a carbonate leaching process, coffinite, a uranium-bearing ore, is ground and leached with aqueous alkaline sodium bicarbonate-sodium carbonate leaching solution. A slurry of pregnant leach solution and leached pulp, containing 50 weight percent solids and having a solution density of 1.1 and a $Na_2CO_3$ concentration of 42.5 grams/liter, is withdrawn from the leaching zone and 12.1 pounds/ton of ore of calcium sulfate is added to the slurry, according to the practice of this invention. The thus-treated slurry, containing 8.9 pounds/ton of ore calcium carbonate, 12.7 pounds/ton of ore sodium sulfate, and having a $Na_2CO_3$ concentration of 37.3 grams/liter, is then passed to a multi-stage filtration zone comprising three vacuum filters and three alternate repulping troughs. The filtrate from the first vacuum filter, comprising pregnant leach solution having a $U_3O_8$ concentration of 2.61 grams/liter, a $Na_2CO_3$ concentration of 37.3 grams/liter, and a $NaHCO_3$ concentration of 14.0 grams/liter, is passed through a precoated clarifying filter. The filtered pulp from the first vacuum filter is repulped with recycle carbonate solution and filtered in a second vacuum filter and washed with recarbonated barren liquor. The filtrate from thes second vacuum filter comprising 1.3 grams/liter $U_3O_8$, 42.5 grams/liter $Na_2CO_3$ and 7.9 grams/liter $NaHCO_3$, is recycled to the ore leaching zone. The filtered pulp from the second filter is repulped with a small amount of recarbonated barren liquor and filtered again in a third vacuum filter. The filtrate from the last filtering stage is recycled for use in said first filtering and repulping stages. The filtered pulp from the last filter is repulped and passed to a tailing pond, this filter pulp comprising tailings containing 13.1 pounds of $Na_2CO_3$ per ton of ore, and 8.9 pounds of $CaCO_3$ per ton of ore.

To the clarified pregnant leach solution, 19.5 pounds/ton of ore of sodium hydroxide is added to neutralize the bicarbonate and precipitate the soluble uranium values present therein. The resulting precipitate-containing slurry, having a $Na_2CO_3$ concentration of 56.2 grams/liter and an excess NaOH concentration of 5.4 grams/liter, is passed to a thickener and thickened. The overflow from the thickener, comprising barren liquor having a $U_3O_8$ concentration of 0.1 gram/liter and a $Na_2CO_3$ concentration of 56.2 grams/liter, is then passed to a packed recarbonation tower and recarbonated with flue gas. The recarbonated barren liquor, having a $Na_2CO_3$ concentration of 59.4 grams/liter, is then passed to the second vacuum filtering and repulping stages. The thickened slurry is withdrawn from the thickener and filtered to recover a yellow cake product comprising 80 weight percent $U_3O_8$.

But for the calcium sulfate treatment of the leach effluent according to the present invention, the leach effluent would have a higher $Na_2CO_3$ concentration of 84.4 grams/liter, 22.5 pounds/ton of ore $Na_2CO_3$ would be lost with the tailings, 25.5 pounds/ton of ore of NaOH would be required in the precipitation of the yellow cake, and the recycled recarbonated barren liquor would have a $U_3O_8$ concentration of 0.21 gram/liter and a $Na_2CO_3$ concentration of 103.4 grams/liter.

Various modifications and alterations of this invention will become apparent to those skilled in the art without departing from the scope and spirit of this invention, and it should be understood that the foregoing illustrations and examples are not to be construed so as to unduly limit this invention.

I claim:

1. In a carbonate leaching process for leaching uranium bearing ore, wherein said ore is leached with alkaline carbonate-bicarbonate leaching solution, the resulting slurry of leached pulp and pregnant leach solution is filtered in a first filtration zone, the leached pulp retained in said filtration zone is washed with recarbonated barren liquor which is then recycled to said leaching step, the resulting pregnant leach solution is clarified and passed to a precipitation zone where soluble uranium values present in said pregnant leach solution are precipitated by the addition of aqueous sodium hydroxide thereto, the resulting slurry of precipitated uranium values is passed to a thickening zone and thickened, the resulting thickened slurry is passed to a second filtration zone for the recovery of said precipitated uranium values, the overflow from said thickening zone comprising barren liquor is passed to a recarbonation zone, and the resulting recarbonated barren liquor is passed to said first filtration zone and used in washing said leached pulp, the improvement comprising adding calcium sulfate to said slurry of leached pulp and pregnant leach solution in an amount sufficient to prevent the carbonate concentration in said process from pyramiding and exceeding that predetermined concentration at which said ore is best leached.

2. The process according to claim 1 wherein said calcium sulfate is added in an amount sufficient to maintain the carbonate concentration of said leaching solution at about 20 to 50 grams/liter.

References Cited in the file of this patent

UNITED STATES PATENTS

| | | |
|---|---|---|
| 2,743,222 | Clevenger | Apr. 24, 1956 |
| 2,813,003 | Thunaes et al. | Nov. 12, 1957 |
| 2,830,871 | Kaufman et al. | Apr. 15, 1958 |

OTHER REFERENCES

AEC Document WIN–73, pages 7–9, 12, 15, 16, 20, 23, 26, 27, June 11, 1957.

ACCO–48, pages 5–33, June 18, 1954.

WIN–67, pages 8–12, 14–30, June 11, 1957.

Stephens et al.: "Int. Conf. on Peaceful Uses of Atomic Energy," vol. 8, page 20, New York, 1956.